(12) United States Patent
Megiddo et al.

(10) Patent No.: US 8,239,227 B2
(45) Date of Patent: Aug. 7, 2012

(54) EXECUTIVE REPORTING

(75) Inventors: Eran Megiddo, Bellevue, WA (US);
Richard J. Wolf, Seattle, WA (US);
Susan T. Dumais, Kirkland, WA (US);
Jensen M. Harris, Kirkland, WA (US);
Joshua T. Goodman, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1051 days.

(21) Appl. No.: 11/874,151

(22) Filed: Oct. 17, 2007

(65) Prior Publication Data

US 2009/0106059 A1 Apr. 23, 2009

(51) Int. Cl.
*G06Q 40/00* (2006.01)
(52) U.S. Cl. .............. 705/7; 705/35; 705/36; 705/37; 705/38; 705/39
(58) Field of Classification Search .......... 705/7, 35, 705/36, 37, 38, 39
See application file for complete search history.

(56) References Cited

U.S. PATENT DOCUMENTS

| | | | |
|---|---|---|---|
| 7,606,750 B1* | 10/2009 | Hoag et al. ............... | 705/35 |
| 2003/0188290 A1 | 10/2003 | Corral | |
| 2003/0229524 A1 | 12/2003 | Reuveni | |
| 2004/0049465 A1* | 3/2004 | Engler et al. ............. | 705/51 |
| 2005/0154664 A1* | 7/2005 | Guy et al. ................ | 705/35 |
| 2006/0010023 A1 | 1/2006 | Tromczynski et al. | |
| 2006/0089939 A1 | 4/2006 | Broda et al. | |
| 2006/0143243 A1* | 6/2006 | Polo-Malouvier et al. ... | 707/203 |
| 2006/0247938 A1 | 11/2006 | Thieret | |
| 2007/0016871 A1 | 1/2007 | Magnifico | |
| 2007/0039049 A1 | 2/2007 | Kupferman et al. | |
| 2007/0150585 A1 | 6/2007 | Chkodrov | |
| 2007/0266042 A1* | 11/2007 | Hsu et al. ................ | 707/102 |

OTHER PUBLICATIONS

Harpal Kochar. Oracle Business Activity Monitoring. An Oracle White Paper, Jun. 2005. http://www.oracle.com/technology/products/integration/bam/pdf/bam_whitepaper.pdf. Last accessed Dec. 3, 2007, 13 pages.
John Medicke, et al. Create an intelligent and flexible solution with BPM, Business Rules, and Business Intelligence: Business process analysis, Oct. 9, 2003. http://www.ibm.com/developerworks/db2/library/techarticle/0310medicke/0310medicke.html. Last accessed Dec. 3, 2007, 13 pages.
EYE Executive Reporting Module http://www.entuity.com/collateral/EYE-Executive-Reporting-Module.pdf. Last accessed Dec. 3, 2007, 4 pages.
Vision for Microsoft, REPMICROSOFT0206D-ENG http://uk.systemsunion.com/downloads/Vision%20for%20Microsoft.pdf. Last accessed Dec. 3, 2007, 2 pages.
Business Intelligence http://www.softrax.com/solutions/business-intelligence/. Last accessed Dec. 3, 2007, 2 pages.

* cited by examiner

*Primary Examiner* — Nga B. Nguyen
(74) *Attorney, Agent, or Firm* — Lee & Hayes, PLLC

(57) ABSTRACT

Providing for generating an executive report of business or personal activity is described herein. By way of example, such executive report can identify a change and related cause with respect to a prior report. As a particular example, an inference engine can receive an activity report and reference prior reports to identify the change and related cause. A set of results containing such information can be provided to a synthesis component that can include and highlight such information in the executive report. In addition, additional sources of data can be referenced in order to include and/or customize the report to a particular individual, organization, culture, or the like. As described, aspects of the subject innovation can provide an executive report highlighting important aspects of data and tailoring those aspects to interests of one or more users.

19 Claims, 12 Drawing Sheets

EXECUTIVE REPORTING

BACKGROUND

In an information centric world, a typical manager or executive spends a substantial amount of time researching business information or filtering through such information. As a particular example, an individual can easily access vast amounts of data to summarize past business activity and to inform future business practice (e.g., by way of the Internet), but filtering irrelevant data to uncover pertinent 'nuggets' of information can be a time consuming task. The executive can utilize a search engine to refine and qualify a data search, but interaction with the search engine is still a manual procedure.

Businesses typically summarize economic progress, including marketing and sales information, overhead costs, human resource statistics, general budget information, and various related information in executive reports. Some reports can be periodic, providing a snapshot of relevant data at various points in time (e.g., daily, weekly, monthly, etc.) To a manager or executive, such reports can be a critical mechanism for planning future activity. For instance, budgets are often planned based on projected sales reports, overhead cost evaluations, or the like, indicating potential future revenues. Travel can be organized around a need to interface with clients, customers, suppliers, and so on, indicated by feedback from such entities. Furthermore, future business opportunities, and expenses incurred in fostering them, can depend on fluctuation in national or regional markets, understanding demands of particular organizations, correctly interpreting international politics, and so on; understanding these factors is based heavily on having sufficient and appropriate information. As a result, an ability to develop successful management strategies can depend on the quality and appropriateness of information contained in these executive reports.

Although summarizing business information is an age-old concept, room for improvement remains in terms of personalizing such information. Executives or their assistants typically must sort through a report in order to find information pertinent to a particular need, especially if such a report aggregates information for multiple aspects of a business (e.g., new product studies, supplier evaluations, engineering reports, and quality control information). Consequently, there is room for improvement in personalizing executive reporting for individual aspects of a business.

SUMMARY

The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

The subject matter disclosed and claimed herein, in various aspects thereof, provides for generating an executive report of business or personal activity and identifying a change and a cause of the change with respect to a prior report. For example, a system can include an inference engine that receives an activity report and provides a set of results identifying a change over a prior report and a cause of such change. The inference engine can provide the set of results to a synthesis component that can include and highlight the change and cause thereof in the executive report. As described, aspects of the subject innovation can provide an executive report highlighting important aspects of data; specifically, changes between concurrent and prior data sets and a cause(s) pertaining to such changes.

In accordance with additional aspects of the claimed subject matter, an executive report is provided that includes information biased to the needs of a particular user. A data abstraction component can weight a set of data as a function of recent or planned events or meetings, an interaction history with specified entities, a user contact list, a to do list, or the like, to personalize the data to an individual consumer. Furthermore, a synchronization component can provide an interface with a dynamic data source, and update the set of data in response to changes at the dynamic data source. In accordance with still other aspects, a community search engine can compare results of an electronic task with aggregated results for similarly situated users. A recommendation can then be provided based on a statistical evaluation of the comparison (e.g., a recommendation to switch to a different supplier of 'widget x' based on a comparison of price paid with average price paid in a particular industry). As described, personalized and/or updated data and recommendations can be provided in an executive report to facilitate rapid and accurate consumption of such data.

In accordance with still other aspects of the subject innovation, an executive report can be formatted in a language or cultural visualization appropriate for a user and/or a venue of an event. For instance, a custom visualization component can reference a data network and/or a user profile to format a presentation or appearance of the executive report. Such appearance can utilize a language, alphabet, dialect, or a body of standards (e.g., metric or English measurement system) appropriate for a predetermined culture or society. In addition, the presentation or visualization can be structured and/or updated with respect to current events, graphical depictions, histories, or news, or combinations thereof, pertinent to the culture or society. As a result, the executive report can foster a context appropriate for an individual or an event by generating a visualization representative of the individual's culture and/or an entity hosting the event.

The following description and the annexed drawings set forth in detail certain illustrative aspects of the claimed subject matter. These aspects are indicative, however, of but a few of the various ways in which the principles of the claimed subject matter may be employed and the claimed subject matter is intended to include all such aspects and their equivalents. Other advantages and distinguishing features of the claimed subject matter will become apparent from the following detailed description of the claimed subject matter when considered in conjunction with the drawings.

DETAILED DESCRIPTION

Figure 1:
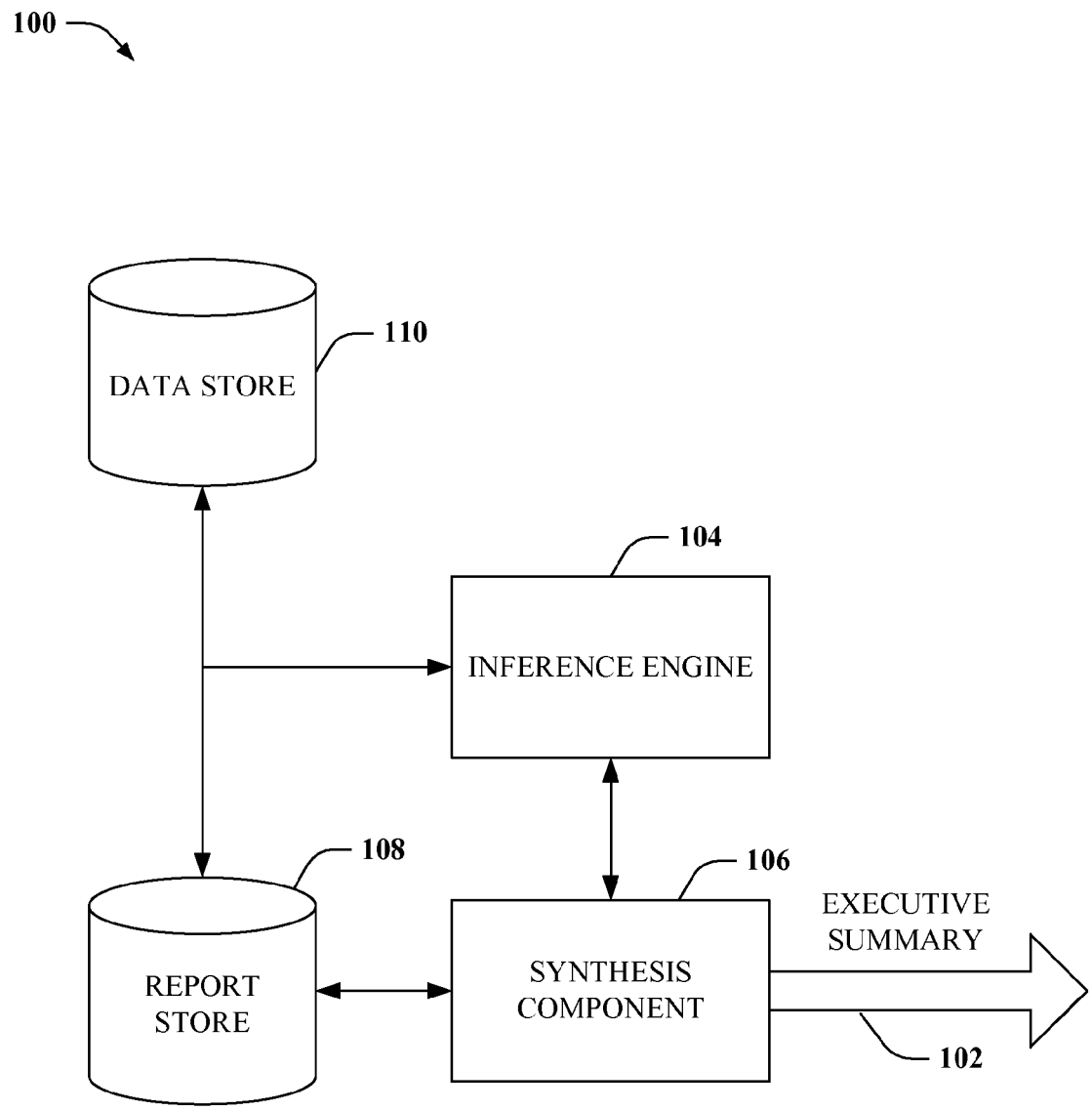
FIG. 1 illustrates a sample system that provides an executive report including changes over prior report, in accordance aspects of the subject innovation.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "module," "system", "interface", or the like, are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. As another example, an interface can include I/O components as well as associated processor, application, and/or API components, and can be as simple as a command line or a more complex Integrated Development Environment (IDE).

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic-that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In the business world, data analysis and other reporting can be broadly categorized into three main areas: periodic, event-based, and exploratory. Periodic reporting relates to data for which tracking is on-going and usually predefined. For example, a user may receive a periodic inventory report every morning, or a periodic finance summary once per month, etc. Event-based reporting is generally not predefined and relates to some particular event or effect. For example, a user may want to know how a labor strike will affect distribution or why sales are tapering off in a particular region of the country. Exploratory reporting may be based upon arbitrary querying and/or searching of retained business data, for instance.

Aspects of the subjection innovation provide a number of useful features for periodic and event-based reporting. Conventional periodic reporting tends to repeat previous data, making it difficult to filter through repetitious data to spot changes and trends therein. For instance, a current inventory report may look substantially similar to a previous day's inventory report, but typically a user cares only about what has changed since the last time this report was viewed. Existing tools do not provide a view that emphasizes changes in data. According to an aspect, the invention can provide periodic reports that display what has changed, what has changed the most, and/or what caused the changes. With regard to event-based reports, such as a request by a superior to research a drop in sales in New York for instance, a report must first be authored if such report does not already exist. The invention can attempt to answer such a question by leveraging search engine technologies. For example, a user can enter "Why are sales dropping in NY?" and be presented with a dynamic report that includes automatically generated views of data to answer this question.

Referring to FIG. 1, a system 100 is depicted that can generate an executive summary 102 of periodic data that emphasizes changes over prior versions of such data. In addition, system 100 can determine a cause or causes of such change by, for instance, evaluating prior versions of the periodic data in conjunction with relevant external data. Identified changes and related causes can be included in the executive summary 102 to provide a quick overview of information most likely of interest.

System 100 can include an inference engine 104 that receives a set of data related to a periodic report and outputs a set of results. Moreover, the set of results can be indicative of a change within the set of data over at least one prior report and can include one or more causes associated with the change. Determined changes and related causes can be provided to a synthesis component 106 for incorporation into the periodic report.

Inference engine 104 can receive data from a report store 108 that contains a compilation of prior and concurrent data of personal or business data or activities. Such data or activities, for instance, can comprise the subject matter included within a periodic report. For example, report store 108 can include prior and/or contemporaneous sales and marketing information associated with a business, which forms the basis of a marketing report. Such a store (108) can be updated with newly available information. Additionally, information can be segregated within the report store 108 in accordance with various criteria pertinent to the business, such as customer identity, billing cycle, amount of revenue generated, cost to overhead, or any other suitable qualification of data pertinent to a business or a portion thereof (e.g., an employee, manager, executive, member of a board of directors, etc.) It should be appreciated that report store 108 can also include personal information (e.g., travel, contact, schedule, calendar, or appointment information, or the like) particular to one or more users as well as information pertinent to the business as a whole.

Data received at inference engine 104 (e.g., associated with a periodic report) can be analyzed in order to determine changes over current and prior data. For instance, particular keywords can be identified depending on subject matter(s) and/or recipient(s) of the report. For instance, a report summarizing sales in a particular region can be associated with tags, terms, or meta-data, or the like, such as 'revenue', 'sales volume', 'quantities sold', 'projected shortfall or surplus', 'budget', a name of a region (e.g., New York State), and so on. Inference engine 104 can utilize tags and/or keywords, or like subject matter identifiers/qualifiers, to identify pertinent subjects (e.g., segregated in a database as discussed above), data related to those subjects, and changes in the data as a function of time or other parameter. The data can also be associated with an electronic communication of a colleague, employee, team member, supervisor, customer, supplier, social contact, or a member of a buddy list of a user, or a combination thereof or of like individuals. Moreover, the changes can be included within a set of results for incorporation into an executive summary 102 related to the subject matter (e.g., sales in New York State). Furthermore, system 100 can identify a cause of changes in periodic data and include the cause within an executive summary 102.

Inference engine 104 can also extract information from the set of data as a result of a triggering event. For instance, if a user performs an electronic search (e.g., Internet search, intranet search, and so on) of a data store (108, 110) or database pertinent to the personal or business data or activity, inference engine 104 can analyze the set of data, discussed above, to extract information contained therein pertinent to the triggering event. Information within the set of data that is pertinent to the triggering event can be included within the set of results.

Inference engine 104 can access an additional data store 110 to determine a cause associated with changes in data stored at the report store 108. Data store 110 can include various public and/or private compilations of information that can interface with an electronic device. Examples can include an Internet, intranet, or local computer storage device (e.g., hard drive, CD-ROM, DVD-ROM, flash disc, data server, and so on). Inference engine 102 can reference such data store 110 and utilize various data analysis techniques for associating data (e.g., Bayesian networks, Markov models and/or hidden Markov models, or the like) and determine a cause of changes in such data. Alternatively, or in addition, a search engine or database (not depicted) can be employed to identify published articles within data store 110 (e.g., on the Internet) associated with an identified change or changes in a particular subject matter (e.g., drop in sales in New York State). The search engine can also be employed to identify reports in a private data store (e.g., report store 108) authored by an employee, contractor, etc., of a business, related to a cause or causes of a change(s). Upon identification of the cause of a change, system 100 can incorporate and highlight such information into an executive summary 102 in a manner that draws attention to the change. As a result, information typically deemed most important for periodic reports can be displayed in a prominent fashion to draw attention thereto.

Synthesis component 106 can filter the set of data or set of results and extract information pertinent to at least one user. The synthesis component 106 can also compile an executive summary of a periodic or event-triggered report that includes the set of results provided by inference engine 104 and the information pertinent to at least one user. The set of results and/or information can include at least one change over a prior report and optionally one or more causes associated with the change(s). Further, the information pertinent to the user(s) can include be related to any predetermined topic associated with the set of data (e.g., stock price of a specified entity, cost of a raw material, an overhead cost for a business, a public valuation of a product or service, a news report containing a predetermined item or entity, and so on). In addition, synthesis component 106 can highlight the change and cause in the executive summary 102 to draw attention thereto. Consequently, system 100 can summarize changes in periodic data in a manner that conspicuously displays the changes and related causes, reducing an amount of time required to extract useful information there from.

Figure 2:
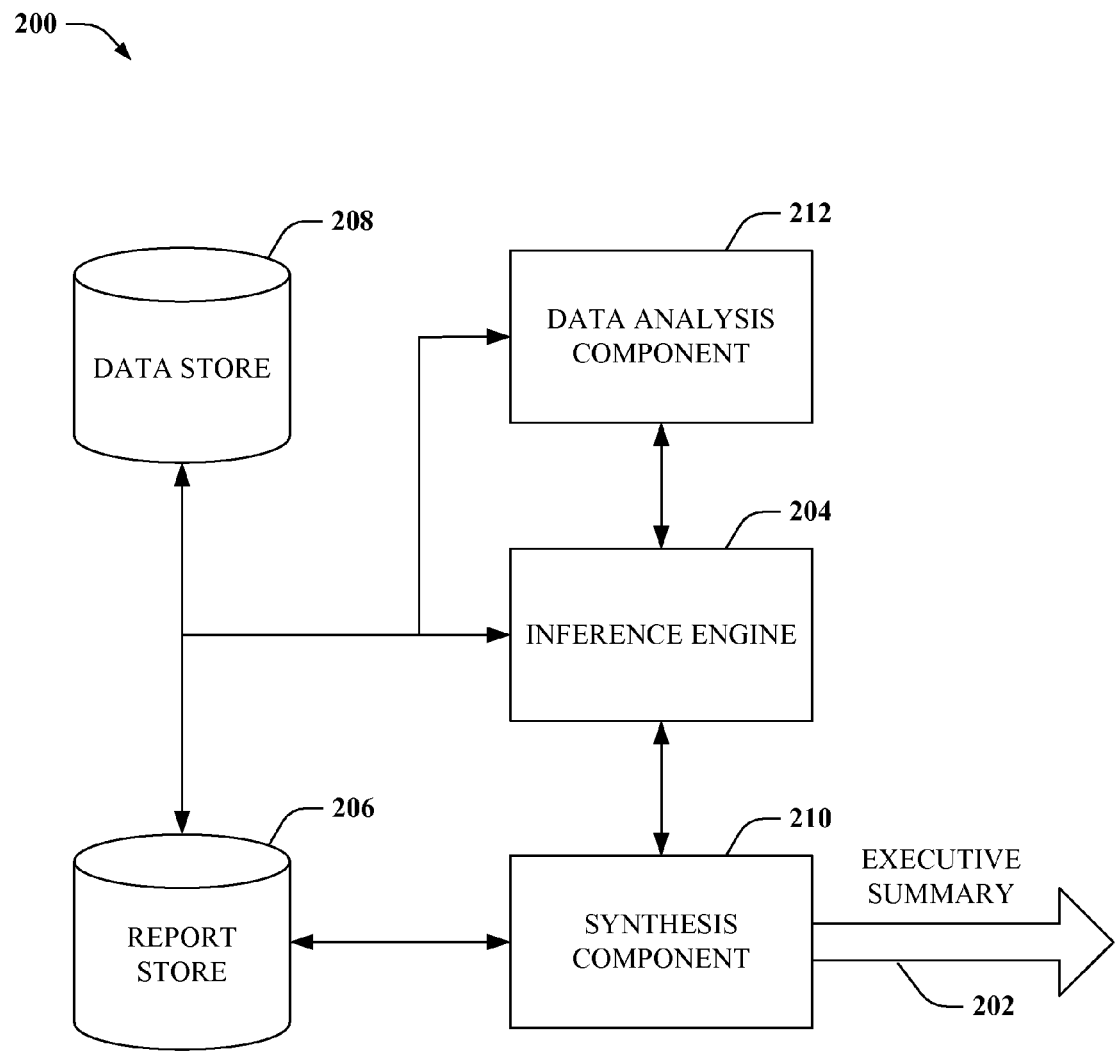
FIG. 2 depicts a sample system that can indicate a significance of changing data in an executive report in accordance with additional aspects.

Referring now to FIG. 2, a system 200 is depicted that can provide additional information to an executive summary 202 of periodic data in accordance with one or more aspects disclosed herein. More particularly, system 200 can determine a magnitude or degree of a change (e.g., relative to an additional change, or as an absolute quantity/quality, or the like) in periodic data and include the magnitude and/or degree within the executive summary 202. As a result, system 200 can automatically determine and provide an indication as to an importance of a change in data.

System 200 can include an inference engine 204 that can receive a set of data from a report store 206 and/or data store 208 to identify whether a change has occurred in a set of concurrent and prior data. In addition, a cause of such change can be identified by reference to the report store 206 and/or an additional source of data (e.g., the Internet). Inference engine 204 can then provide the change(s) and related cause(s) to a synthesis component 210 for incorporation into a summary (202).

In addition to the foregoing, system 200 can include a data analysis component 212 that can determine a magnitude of a change(s) identified in a set of periodic data. The magnitude can be a specific quantity (e.g., an amount of increased revenue for a current sales quarter with respect to a prior sales quarter(s)), a relative quantity (e.g., 20% increase in sales over last quarter), or a relative qualifier (e.g., sales were much higher this quarter than last), or a combination thereof. The data analysis component can utilize various mathematical operations and/or statistical formulae known in the art (e.g., including addition, subtraction and other suitable mathematical equations for determining a quantitative magnitude, as well as mean, mode, average, and like statistical methods for summarizing quantifiable data). Data analysis component 212 can reference the report store 206 or an additional data store 208 (e.g., the Internet) to identify pertinent statistical information related to some change in periodic data, and provide a determined magnitude within a set of data received at the inference engine 204.

Magnitude information associated with changes identified by inference engine 204 can be incorporated within a set of results provided to the synthesis component 210. As described with respect to FIG. 1, supra, the identified changes can be incorporated into the executive summary 202, and furthermore can be displayed at least as a function of magnitude of change. Specifically, an item or event that has changed more than a related item or event can be displayed more prominently (e.g., listed first, highlighted, emboldened, underlined, displayed in a larger or more conspicuous font, and so on). As a result, system 200 can provide and highlight changes in periodic data and display such changes as a function of a magnitude of the change.

Figure 3:
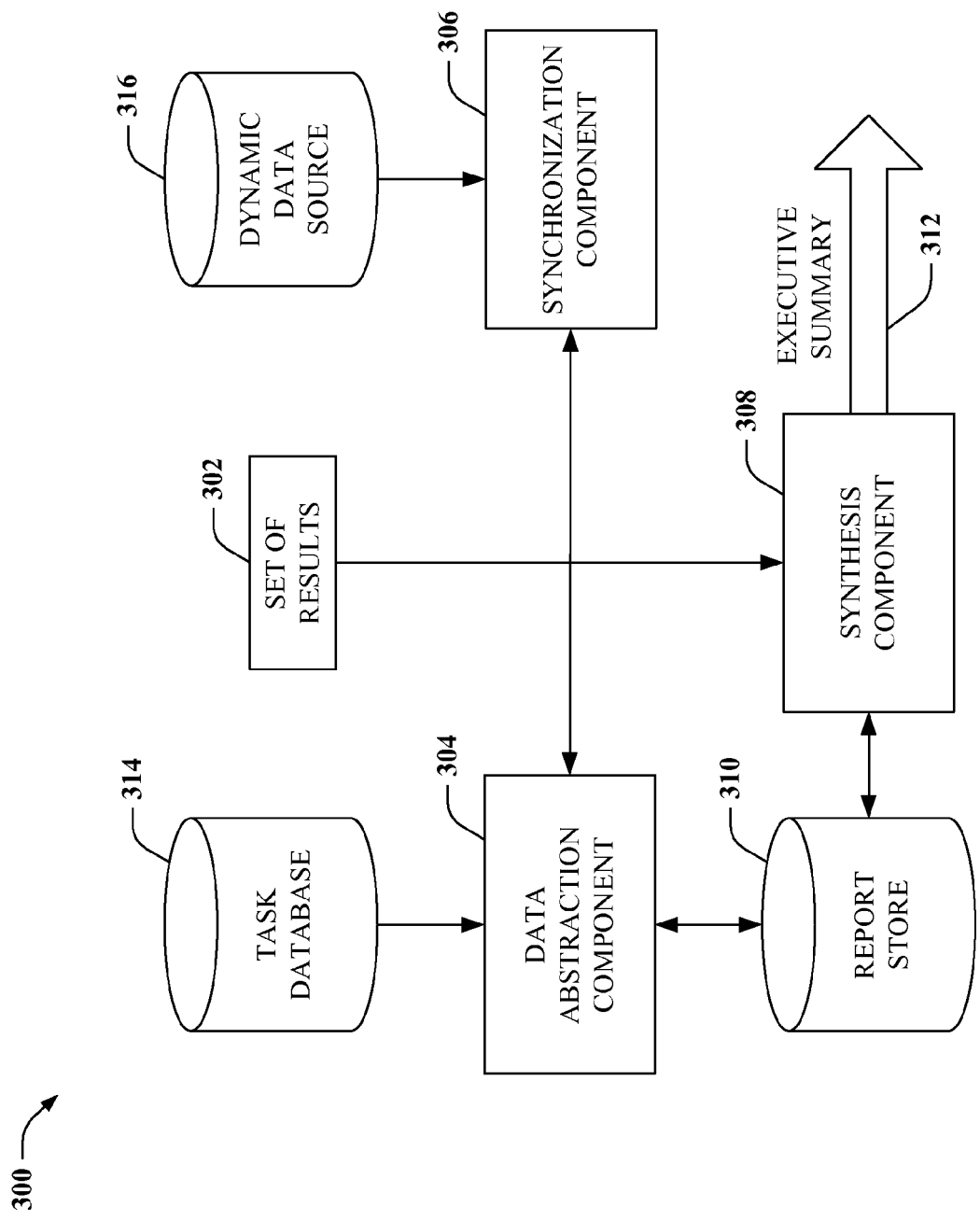
FIG. 3 illustrates an example system that can update and tailor data to needs of a particular user.

Referring now to FIG. 3, a system 300 is depicted that can dynamically update and filter data in accordance with particular information known about a user. A set of results 302 containing information about periodic data (e.g., changes and related causes in a periodic report over a prior report), or containing event-initiated data (e.g., provided by an Internet search engine in response to a search, a received electronic communication, or the like), or combinations thereof or of the like, can be received by components (304, 306, 308) of system 300. In addition, such components (304, 306, 308) can reference external sources of data (310, 312, 314) and modify or consume the information in the set of results 302 accordingly (e.g., in accordance with changes to a dynamic data source and/or data personal to a user, or the like). Modified data can be actively incorporated into an executive summary 316 by a synthesis component 308 as described herein.

In accordance with particular aspects of the subject innovation, system 300 can sort and/or weight information in a set of results 302 (e.g., generated by an inference engine as described supra at FIG. 1 and/or FIG. 2) based on a relation with a second set of data. More particularly, a data abstraction component 304 can filter information in the set of results 302 as a function of recent user activity, a history of user interactions, a source of user interest, a user contact list, or the like. Sources of user information can be stored at a task database 314, for instance. It should be appreciated that task database 314 can be any suitable storage device containing information about prior business and/or social interactions and entities involved in such interactions.

Examples of task database 314 can include a hard drive, flash drive, DVD or CD-ROM drive, or the like. Examples of user information contained on task database 314 can include information regarding appointments within an electronic calendar application, both past and present, a business or personal contact list, a buddy list, a list of colleagues, associates, employees, supervisors, etc., a client list, supplier list, or other list of business contacts, a list of results provided by a search engine or database (e.g., identifying people, businesses, results of an online purchase or research related to such a purchase, or identifying travel itineraries, vacation spots, and so on, in conjunction with various search criteria), a list of individuals associated with a user by a particular hobby, sport, group, or the like, or any suitable combination of these or like interactions and associated entities. In addition, the user information can include a dynamically generated list (e.g., all people that a user sent e-mail to) comprised of varying portions of data that can change according to objective parameters (e.g., time, topic or subject, title, tag(s), associated application such as e-mail). As a more specific example, a dynamic list can include all recipients who received e-mail on a selected topic, within the past 24 hours, from a selected user(s), in response to a selected question and/or pertinent to a particular task, and so on.

As described, information within the set of results 302 can be weighted by data abstraction component 304 depending on a degree of relation, if any, with data in the task database 314. Consequently, data abstraction component 304 can modify the set of results 302 provided to synthesis component 308 (e.g., for inclusion within an executive summary) as a function of a relation between data in the set of results 302 and the task database 314. In such a manner, the set of results 302 can be automatically filtered so as to be relevant to a predetermined set of static or dynamic data (314).

The following examples are intended to provide context for aspects of system 300, but are not to be construed as limiting the disclosed subject matter to the particular embodiments articulated. Rather, like examples known in the art or made known to one of skill in the art by way of the context provided herein are included within the scope of the subject specification. With respect to a first example, set of results 302 includes information related to sales activity for a software provider. Particularly, the sales activity includes past revenues, projected revenues, sales per product, per region, per customer, per period of time (e.g., quarter of a year, half of a year, 5 year period, and so on). An employee of the software provider has an upcoming calendar appointment with a customer of the software provider, customer A. Under these circumstances, data abstraction component 304 can modify the set of results 302 at least as a function of a relation between the sales activity and the calendar appointment. As a more specific example, sales data related to customer A can be extracted from the set of results 302 and given a higher priority over other data contained therein. For instance, prior sales to customer A, projected sales to customer A, products sold to customer A and quantities of such products, or the like, can be marked, weighted, or the like, within the set of results 302. Consequently, an executive summary 312 of the modified set of results (302) can emphasize such information.

As a second, non-limiting example, set of results 302 includes results of a search for hotels in Washington, D.C. The set of results 302 can be received by data abstraction component 304, triggering a relation search between such set of results 302 and a task database 314. In this instance, task database 314 contains frequent traveler information for a particular hotel chain (e.g., specified in e-mail messages stored on a computer, laptop, PDA, cell phone hard drive or memory). Data abstraction component 304 can modify the set of results 302 so as to mark or weight data therein related to the particular hotel chain. Additionally, data abstraction component can include (e.g., embed a link to, cross-reference, add the data, and so on) correlated data from the task database 314 into the modified set of results (302). An executive summary 312 generated from the modified set of results (302) can include, emphasize, highlight, sort, summarize, etc., the data marked or weighted by data abstraction component 304 so as to make it more conspicuous with respect to other data in the set of results 302.

As a third, non-limiting example set of results 302 includes information sent to a user of system 300 by an external entity (e.g., an e-mail message, text message, or other suitable electronic communication). More particularly, details about a child's soccer game can be sent from one spouse to another spouse by e-mail. The e-mail itself can comprise the set of results 302 received by components (304, 306, 308) of system 300. Data abstraction component 304 can cross reference data within the e-mail message with task database 314. In this instance, task database contains a date and time of the soccer game (e.g., within an electronic calendar application), an address for a soccer field, and a list of individuals within a 'soccer' heading of a contact list. As a result, data abstraction component can include within set of results 302 the data, time, and address of the soccer game, as well as the names and phone numbers (or, e.g., other contact information) of parents of other children involved in the game, the coach, the referee, etc. According to particular aspects, data abstraction component 304 can reference a data network (e.g., the Internet) and provide further information regarding the soccer game, including a map to the soccer field, based on the address. Such information can be provided within an executive summary 312 based on a modified set of results (302). As illustrated by the foregoing examples, system 300 can, among other things, modify and/or update an executive summary of periodic or triggered data based on a context provided by prior interactions and associations particular to an individual user. Consequently, information can be presented in a manner that highlights aspects of the information (e.g., that are cross-correlated to one or more events/entities) that are important to the user.

In accordance with additional aspects of the claimed subject matter, system 300 can modify a set of results 302 to be consistent with a dynamic set of data (316). More particularly, a synchronization component 306 can reference a dynamic data source 316 and update and/or compile a set of results 302 for synthesis component 308 to incorporate into an executive summary 312. Thus, a change in the dynamic source of data 316 can trigger a modification of the set of results 302, or a new set of results 302, with the changing data (and, e.g., a cause or magnitude of such change, as discussed with respect to FIG. 2, supra) marked or weighted for emphasis. As used herein, dynamic data source 316 can include a particular local or network data store (e.g., local hard drive, server or database of a private network), or a public data network (e.g., the Internet) or a particular source of data on such a network (e.g., a particular web site, data server address, or the like).

As a specific example of the foregoing, data pertinent to a person's location and/or mobility can be utilized as a portion of the dynamic set of data (316). Specifically, a user's location, rate of travel, trajectory, deviations from a planned trajectory or rate, and so on (determined, e.g., from a device global positioning system [GPS], mobile triangulation system, or satellite location system), can be utilized to trigger modification/compilation of a set of results 302. Thus, if a user deviates from a particular travel trajectory, for instance, synchronization component 306 can be triggered. As another example, if a travel trajectory brings a person within a threshold distance of an identified point of interest (e.g., a landmark, a restaurant, a lodging facility, ice cream shop, chocolate factory etc.) synchronization component 306 can be triggered, as described above, as well. Accordingly, system 300 can provide and/or modify an executive summary 316 according to mobility information determined about a person.

Figure 5:
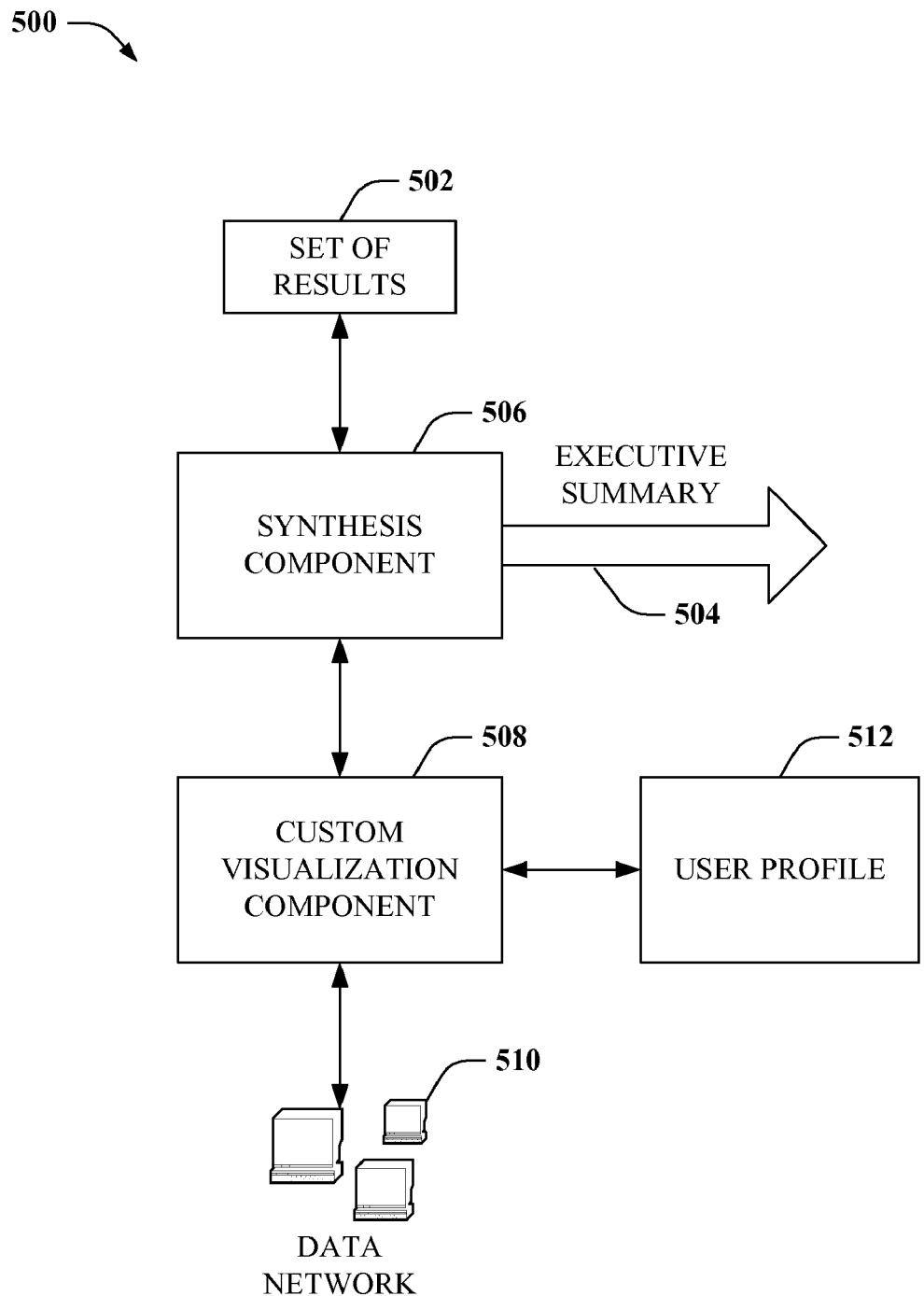
FIG. 5 depicts a sample system that provides a custom visualization for an executive report in accordance with one or more aspects.

In accordance with still other aspects, a change factor can be established by\provided to synchronization component 306 (e.g., in conjunction with a user profile, as depicted at FIG. 5, infra) that specifies a degree and/or type of change required to trigger a modification\compilation of the set of results 302, as described above. For instance, a threshold can be established for a particular parameter (e.g. price) where only changes in the parameter that rise above the threshold result in generation/modification of set of results 302 to be consistent with the dynamic data source 316. In this manner, a significance level can be established enabling insignificant changes to be ignored. As another example, the change factor can require a rate of change of the parameter (e.g., rapid change in price, or a threshold frequency, and so on) be met, or a particular pattern (e.g., a periodic function, or semi-periodic function of a change in price) be met, or any suitable combination thereof or of like.

In accordance with further aspects, one or more data qualifiers (e.g., categories, such as stock data, data about a particular sporting event, from a particular person, or the like) can be established limiting synchronization to a particular field of data. For instance, the data qualifier can establish that only dynamic data (316) correlated to some or all data within task database 314, as described above, is to be synchronized with set of results 302. As a more specific example, a user can specify that only data (316) pertinent to sales of company A is to be synchronized. In such a case, data related to sales of company A would trigger an update by synchronization component 306, but no other change in data would then trigger such an update. As a result, system 300 can provide synchronization with a dynamic source of data external to a set of results 302 according to a particular threshold level of activity, and according to a particular topic of subject matter.

System 300 can further include modified or updated data within a set of results 302 into an executive summary 312. The summary (312) can be provided or updated, as described above, as a result of periodic activity, triggered events, or changes to a dynamic source of data. In addition, the summary can be limited only to particular changes (e.g., over a certain threshold, having a certain frequency, or pattern) and/or related to a particular topic or other set of data. Moreover, such a summary (312) can highlight, sort, emphasize, display, etc., data marked/provided by a data abstraction component as pertinent to the particular user, and/or update the summary (312) as a result of a particular change in data. In accordance with still other aspects of the subject innovation, the executive summary 312 can be provided to a personal computer and/or application thereof, a printer, a mobile communication device (e.g., mobile phone, cell phone, multi-mode phone, PDA, game console, or like communication device), and so on. System 300, therefore, can provide a summary of data pertinent to particular interests and activities of a device user, as described herein.

Figure 4:
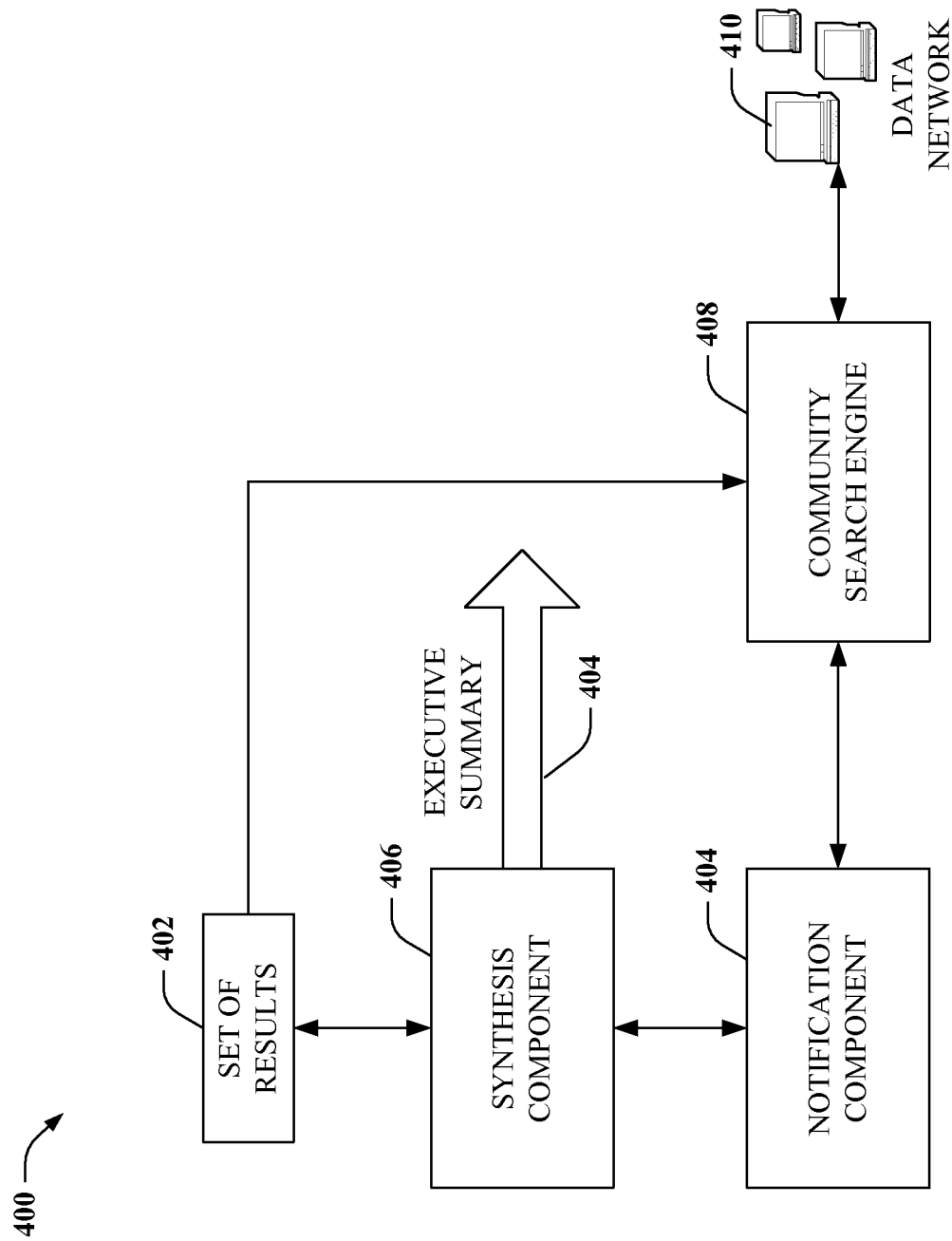
FIG. 4 depicts an example system that can provide business or personal recommendations within an executive report by comparing task results with similarly situated entities.

FIG. 4 illustrates a sample system 400 that can provide additional information and/or suggestions related to results of a business or personal activity, based on comparison with an aggregated benchmark of similar results. For example, a particular task can return a set of results related to that task. Such results can be cross-referenced with data representative of a community of related entities and pertaining to the task, to provide a comparison with results of other individuals/organizations. Such comparison can be useful to establish an appropriate benchmark for the returned results with respect to results of other individuals and/or entities.

System 400 can receive a set of results 402 that can include a compilation of periodic data (e.g., provided by an inference engine 104, 204 as depicted at FIG. 1 and FIG. 2, supra), event-triggered data (e.g., an incoming electronic communication, data provided as a result of a search, an application providing a reminder of a scheduled meeting or appointment, change in a predetermined set of data such as a market price of a product, change in inventory over a threshold, rate of change in an absolute value or value of data such as stock price, concurrent state of traffic in a metropolitan area, upcoming calendar appointment and/or reminders thereof, and so on) or a combination thereof. The set of results can form the basis of an executive summary 404 provided by a synthesis component 406, as described herein. In addition, the set of results 402 can trigger a reference to an data that provides an aggregated benchmark of related results for a community of similarly situated entities. For instance, a community search engine 408 can compare results of an electronic task with the aggregated benchmark, wherein the aggregated benchmark is derived from related task results collected from a community of networked individuals. Such an aggregated benchmark can provide a comparison for gauging appropriateness of task or activity results.

To illustrate the foregoing, but not to limit the scope of the disclosed subject matter, a small business owner can perform a search to identify a hotel for upcoming travel. Results of the search (e.g., provided by a conventional network search engine) can form at least part of set of results 402, indicating a list of available hotels within a particular area for a particular set of dates, and prices for such hotels. In addition, such set of results 402, as well as information utilized to generate set of results 402 (e.g., including keywords entered into a search engine, at least a portion of periodic or event triggered data forming the set of results, or the like) can be provided to a community search engine 408. The set of results 402 can also include, for instance, taxonomy information particular to the small business owner, such as business size, revenue, market share, number of employees, etc., as well as prior travel arrangements, frequent travel information contained within e-mail messages or the like, names, contact information, addresses and the like of contacts local to the area (e.g., people, other businesses, etc.) and so on (e.g., contained within a task database 314, as depicted supra at FIG. 3, or user profile 508 as depicted infra at FIG. 5, or the like).

Community search engine 408 can utilize taxonomy information to identify suitable related entities that had engaged in similar tasks (e.g., other small businesses, owners, employees, or the like and/or related travel accommodations such as air fare, rental vehicles, local entertainment, etc.) and an aggregated benchmark of results for results of those tasks. To continue the above example, utilizing data within set of results 402, community search engine 408 can cross reference a group of other small business or business owners on a data network 410 to find an aggregated benchmark of hotel prices paid by entities similar to the small business owner. Community search engine 408 can provide a result of the aggregated benchmark to a notification component 412, which includes a recommended action in the executive summary (e.g., by providing such action to synthesis component 406) based on the comparison of results. As a more particular example, notification component 412 can indicate that related individuals had spent 15% less on average for a particular hotel or group of hotels than the hotel prices provided in set of results 402, for instance. This notification can then be included within the executive summary 404, as described herein, to suggest modifying parameters of the search in order to receive rates comparable to the aggregated benchmark.

It should be appreciated that a data network 410 as described herein can be an online network (e.g., the Internet) or an enterprise network (e.g., corporate intranet), or combinations thereof. Thus, the community search engine 408 can build and reference a community of individuals on either type of network. As described, system 400 can create and/or reference a community of entities in order to tie data back to a user and include such data into an executive report 404. Consequently, such a report can include information of interest in periodic data results and/or results of a search related to a business or personal activity, as well as provide a comparison to similarly situated entities in regard to such activity.

FIG. 5 illustrates a sample system 500 that provides a custom visualization for an executive report in accordance with one or more aspects. More particularly, system 500 can receive a set of results 502 containing periodic or event-triggered data and provide an executive summary 504 of such data as described herein. In addition, a synthesis component 506 can customize a presentation of the executive summary 504 in terms of cultural and/or regional context provided by a custom visualization component 508. As a result, a summary (504) can incorporate a visualization of data in a language, dialect, etc., appropriate for a particular culture, region, or the like.

In accordance with one or more aspects, system 500 can include a custom visualization component 502 that can format a presentation or appearance of executive summary 504 (e.g., by way of synthesis component 506). More particularly, the summary (504) can be presented in a language, alphabet, dialect, or using a body of standards (e.g., metric or English measurements) appropriate for a predetermined culture or society. Such presentation or visualization can also be updated with respect to current events, graphical depictions, histories, or news pertinent to the culture, society, location, or time, or combinations thereof or of the like.

To generate a format for a presentation of a summary (504) custom visualization component 508 can reference a user profile 510 to determine information pertinent to culture, nationality, region, or the like of a user, or of a venue for a particular event. For instance, the user profile can indicate that a particular user is from, has an interest in, and/or is studying, etc., a particular human culture or society, or that a venue for an event is associated with such culture/society. In addition, custom visualization component 508 can reference meetings and/or appointments to identify a particular venue associated therewith, and identify a culture associated with that venue. (It should be appreciated that a user profile 512 can also contain information pertinent to a user such as past and/or future planned activities, interaction histories, meetings, contacts, travel itineraries, etc., similar to task database 314, depicted at FIG. 3.)

Once a particular culture or nationality, etc., is defined, custom visualization component 508 can then reference a data network 512 (e.g., the Internet, an enterprise network, or local network, mobile network, or the like) based on the culture or society and information related thereto to determine current events, news, histories, graphical depictions, or the like pertinent to the culture or society. Such information can be organized into a particular visualization or presentation for an executive summary 504. As a result, a cultural context can be structured for the summary (504) utilizing a language, alphabet and/or dialect appropriate for the culture (and, e.g., an appropriate translation for a user), graphical depictions pertinent to the culture/society, and the like. Consequently, system 500 can present a summary (504) with a custom visualization appropriate for a cultural context of an individual and/or event.

Figure 6:
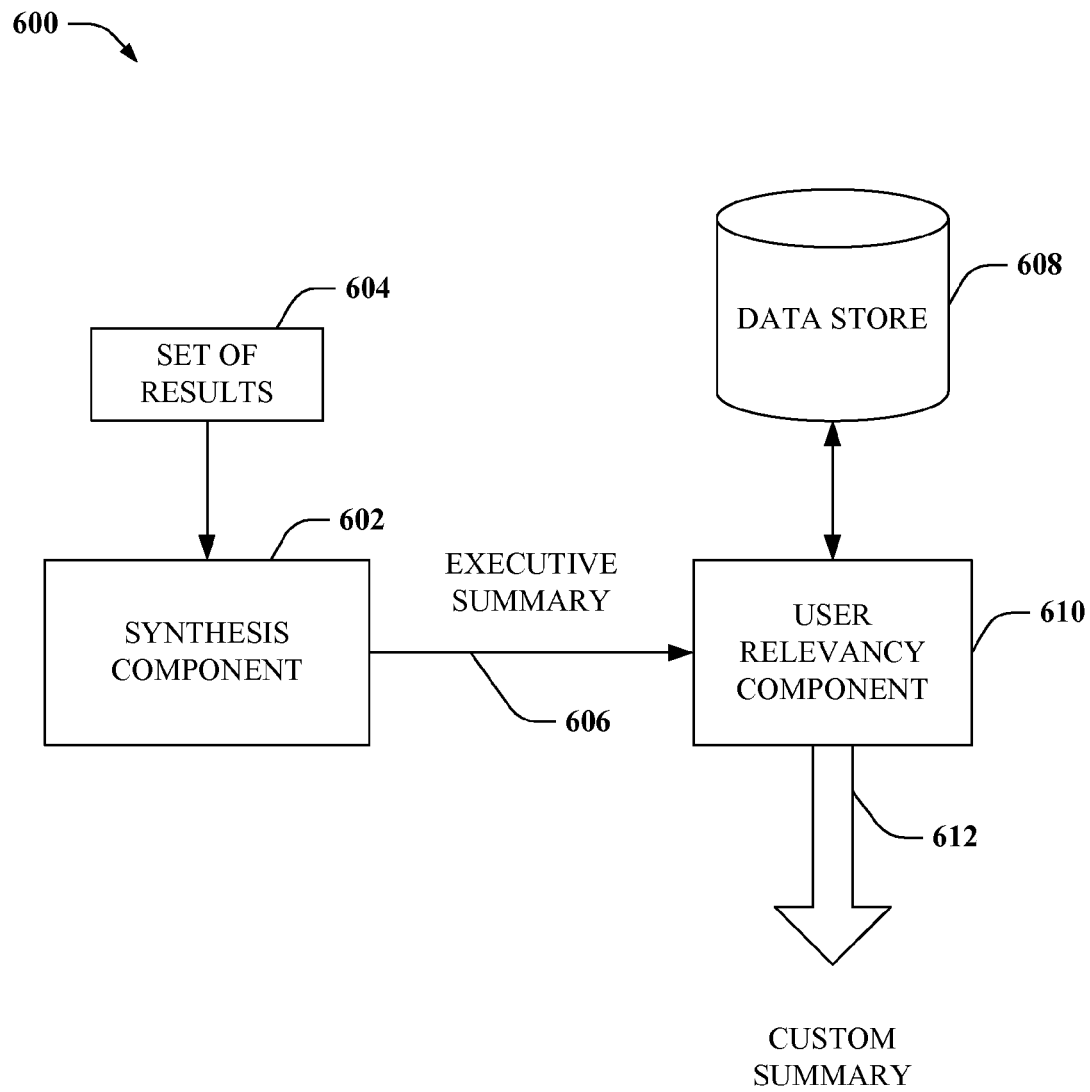
FIG. 6 illustrates an exemplary system that can organize or update an executive report in accord with data personal to a user.

FIG. 6 illustrates an example system 600 that can organize or update an executive report in accord with data personal to a user. As described herein, a synthesis component 602 can receive a set of results 604 pertaining to periodic data (e.g., including changes and causes of changes of such data) or event-triggered data (e.g., including a received electronic communication or results of a search, or the like), or a combination thereof. The synthesis component can organize information in the set of results 604 so as to highlight, emphasize, etc., changes in data and an associated cause or degree thereof, relation to a user specific database (e.g., task database 314 depicted at FIG. 3), or the like, as described herein. In addition, system 600 can structure a presentation of the executive summary 606 in accordance with user specific information, to highlight information most pertinent to a particular user.

In accordance with one or more aspects, system 600 can include a user relevancy component 608 that presents additional information in an executive summary 606 or biases information therein by cross-referencing a second set of data (e.g., in a data store 610). For example, the second set of data (608) can store information related to a user's contact list, calendar appointment list, client list, professional or social buddy list, or individuals or businesses associated therewith, or a combination thereof. Information within the executive summary 606 can then be re-structured with reference to the second set of data. For instance, a product supplier included within the executive summary 606 with respect to changes in supply expenses, that is also contained within a user's calendar appointment list (e.g., within data store 608), for example, can be highlighted, cross-referenced (e.g., a cross-reference between a supplier included within an executive summary, indicating quarterly business expenditures for instance, and a meeting with that supplier stored within a user's calendar list), sorted (e.g., as a function of frequency of occurrence, or indication of importance, such as importance rating of e-mail or a calendar appointment, etc.), grouped together, displayed prominently, or the like. As a result, a general executive summary (606) can be customized so that information most likely pertinent to a user is displayed in a manner that is easily seen and quickly reviewed (e.g., grouped together, labeled with a pertinent subject or topic, listed according to relevancy, or according to a degree of change over prior reports as described with respect to FIG. 1, and so on).

According to a particular example, system 600 can provide a mixed-initiative learning/inference mechanism that enables a user to interact with an executive summary 606 and components (610) of the system to update customized data (608) to reflect the user's modifications. The user relevancy component 610 can receive user-customized information as specified above at the second set of data (608). Furthermore, the user relevancy component can infer one or more customized data forms for the executive summary 606 based on data within the summary (606), one or more user profiles within data store 608, and objective information determined about a user to automatically generate a custom summary 612.

In order to infer the custom summary in this manner, the user relevancy component 610 can utilize a set of models (e.g., user preference model, usage history model, a data comparison and relevancy model, etc.) in connection with determining or inferring modifications to the executive summary based on data within the data store 608 and user preferences (610). The models can be based on a plurality of information (e.g., user-specified data, dynamic parameters, such as time or location, provided by a user, etc.). Optimization routines associated with user relevancy component 610 can harness a model that is trained from previously collected data, a model that is based on a prior model that is updated with new data, via model mixture or data mixing methodology, or simply one that is trained with seed data, and thereafter tuned in real-time by training with actual field data based on user provided parameters.

In addition, user relevancy component 610 can employ learning and reasoning techniques in connection with making determinations or inferences regarding optimization decisions, such as modifying data within the executive summary 606 based on relevancy to data within data store 608 and/or as a function of user-provided weight specified via user relevancy component 610. For example, user relevancy component 610 can employ a probabilistic-based or statistical-based approach in connection with modifying the executive summary 606. Inferences can be based in part upon explicit training of classifier(s) (not shown) before employing the system 600, or implicit training based at least upon one or more monitored previous input choices, and the like, during generation of the custom summary 612. In addition, data or policies used in optimizations can be collected from specific users or from a community of users, for instance. In addition, it should be appreciated that a user profile (610) can indicate whether segments of information within data store 608 (e.g., mobility information, travel information, current market pricing information, previous user history information, etc.) should be utilized to train classifiers and modify/update the executive summary 606 to produce the custom summary 612.

User relevancy component 610 can also employ one of numerous methodologies for learning from data and then drawing inferences from the models so constructed (e.g., Hidden Markov Models (HMMs) and related prototypical dependency models, more general probabilistic graphical models, such as Bayesian networks, e.g., created by structure search using a Bayesian model score or approximation, linear classifiers, such as support vector machines (SVMs), non-linear classifiers, such as methods referred to as "neural network" methodologies, fuzzy logic methodologies, and other approaches that perform data fusion, etc.) in accordance with implementing various aspects described herein. Methodologies employed by user relevancy component 610 can also include mechanisms for the capture of logical relationships such as theorem provers or heuristic rule-based expert systems. Inferences derived from such learned or manually constructed models can be employed in optimization techniques, such as linear and non-linear programming, that seek to maximize some objective function. For example, maximizing an overall relationship/relevancy between one set of data (606) and another set of data (608), taking into consideration predetermined user preferences, association histories, and so on, can be achieved through such optimization techniques.

As described, user relevancy component 610 can receive a general executive summary (606) and output a custom summary 612 based on an association between data in the executive summary and data particular to a user within a data store 608. The data store 608 can be a local hard drive of a computer, laptop or PDA containing user calendar appointments, contact lists, and the like as described herein or known in the art, memory in a mobile device, an enterprise data store on an enterprise network, a data store on a personal network, a data store on a public data network such as the Internet, and so on. In addition, the summary (608) can be automatically adjusted based on machine learning techniques and/or trained classifiers and heuristic relation models as described above. System 600, therefore, can take a standard executive summary (e.g., generated by an enterprise) and tailor such summary to concerns of individual users.

Figure 7:
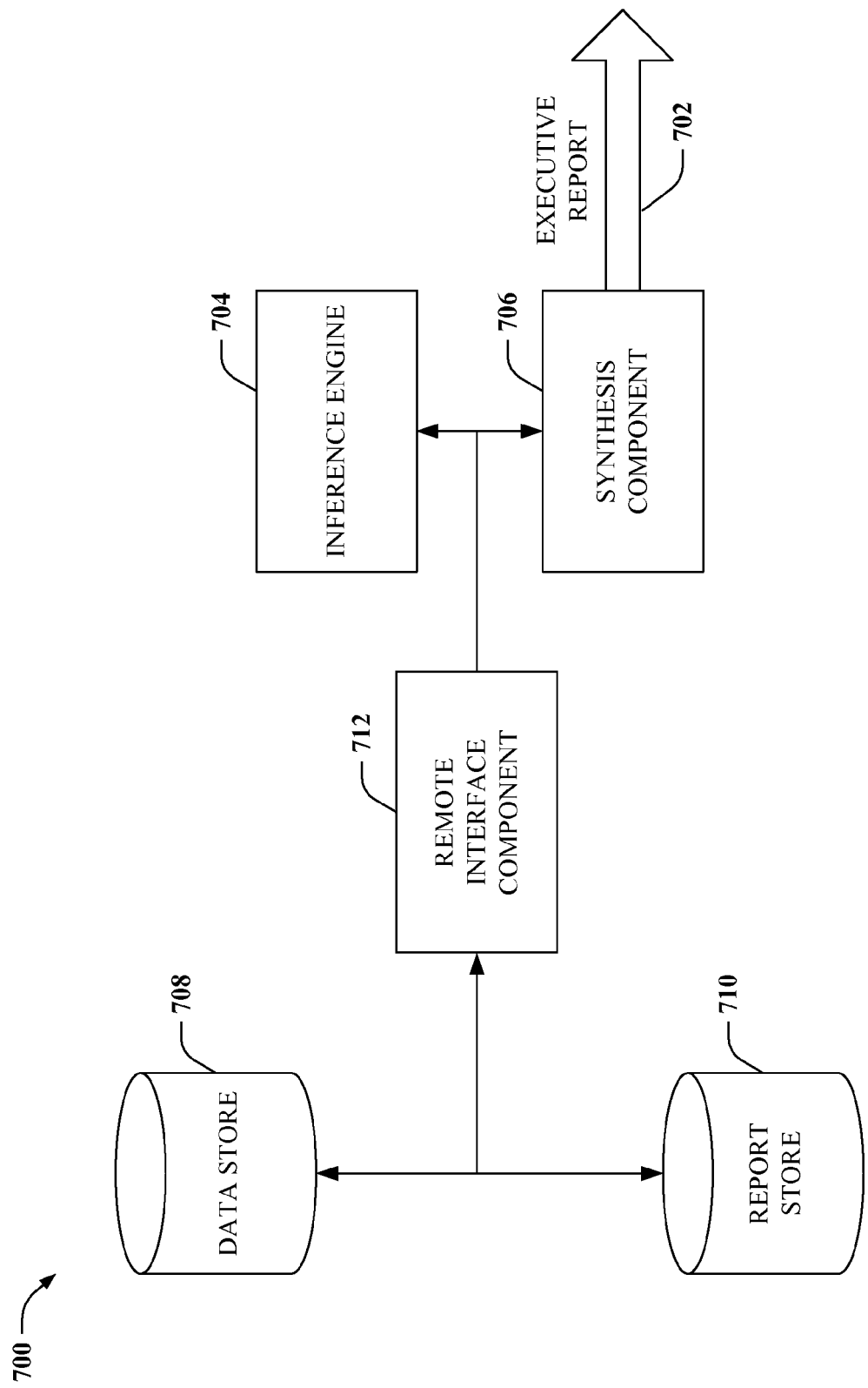
FIG. 7 depicts a sample system that can interface a remote data store and local processing to generate an executive report in accordance with further aspects.

FIG. 7 depicts an example system 700 that can interface a remote data store and local processing to generate an executive report 702 from a broad source of data while reducing latency in accordance with further aspects. An inference engine 704 can receive periodic and/or event-triggered data and identify changes, and associated causes and magnitudes, in such data. Inference engine 704 can also identify associations between the periodic and/or event-triggered data with respect to one or more other data sets particular to a user or that contain dynamic information, as described herein. Inference engine 704 can output a set of results to a synthesis component 706 to incorporate into an executive report 702. The executive report can be a general summary for members of an organization or groups of members, and/or specific to particular users. In addition, system 700 can facilitate access to remote storage servers (708 and/or 710) and couple such remote storage servers (708 and/or 710) to processing components (704, 706) local to a machine or device (e.g., computer, laptop, PDA, mobile phone, and so on). As a result, system 700 can provide local processing in conjunction with data storage in the cloud (e.g., the Internet or a large enterprise network) to provide access to a relatively large source of data while reducing latency associated with remote processing.

In accordance with particular aspects of the claimed subject matter, system 700 can include a remote interface component 712 that can facilitate receipt of a set of data, a periodic report, or a prior report, from a remote network data store (708, 710) and facilitate compilation of an executive summary or report 702 at a local processor of a device. For instance, the remote interface component 712 can transfer data send and receive requests from the inference engine 704, local to a device, to a data store 708 and/or a report store 710 located on a large enterprise data server. Such transfer can include minimal processing by remote components (708, 710) to reduce latency involved with querying and receiving data. For instance, an application (not depicted) at the remote data store(s) (708, 710) can organize data into predetermined topics or categories. Queries from inference engine 704 can be translated in accordance with the remote organization scheme to reduce remote processing. As a result, data analysis done by inference engine 704 and synthesis component 706 in generating the executive report 702 can utilize an Internet class data server (708, 710) for instance, without suffering from latency problems that typically result there from.

It should be appreciated that various other mechanisms for reducing remote processing, known in the art, can be incorporated into system 700 without departing from the scope of the subject disclosure. Such other mechanisms are incorporated herein. As described, system 700 can implement aspects of the subject disclosure by interfacing with a large source of data but while providing optimal processing of such data at a local machine. Consequently, system 700 can facilitate efficient generation of an executive summary or report 702, as described herein, in conjunction with reference to a vast source of data such as an Internet class data store.

The aforementioned systems have been described with respect to interaction between several components. It should be appreciated that such systems and components can include those components or sub-components specified therein, some of the specified components or sub-components, and/or additional components. For example, a system could include inference engine 104, synthesis component 106, report store 108, data store 110, data analysis component 212, data abstraction component 308, and task database 314, or a different combination of these and other components. Sub-components could also be implemented as components communicatively coupled to other components rather than included within parent components. Additionally, it should be noted that one or more components may be combined into a single component providing aggregate functionality. For instance, inference engine 104 can include synthesis component 106, or vice versa, to facilitate requesting input and receiving a reply to such request by way of a single component. The components may also interact with one or more other components not specifically described herein but known by those of skill in the art.

Furthermore, as will be appreciated, various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, and in addition to that already described herein, can automate certain mechanisms or processes performed thereby to make portions of the systems and methods more adaptive as well as efficient and intelligent.

Figure 8:
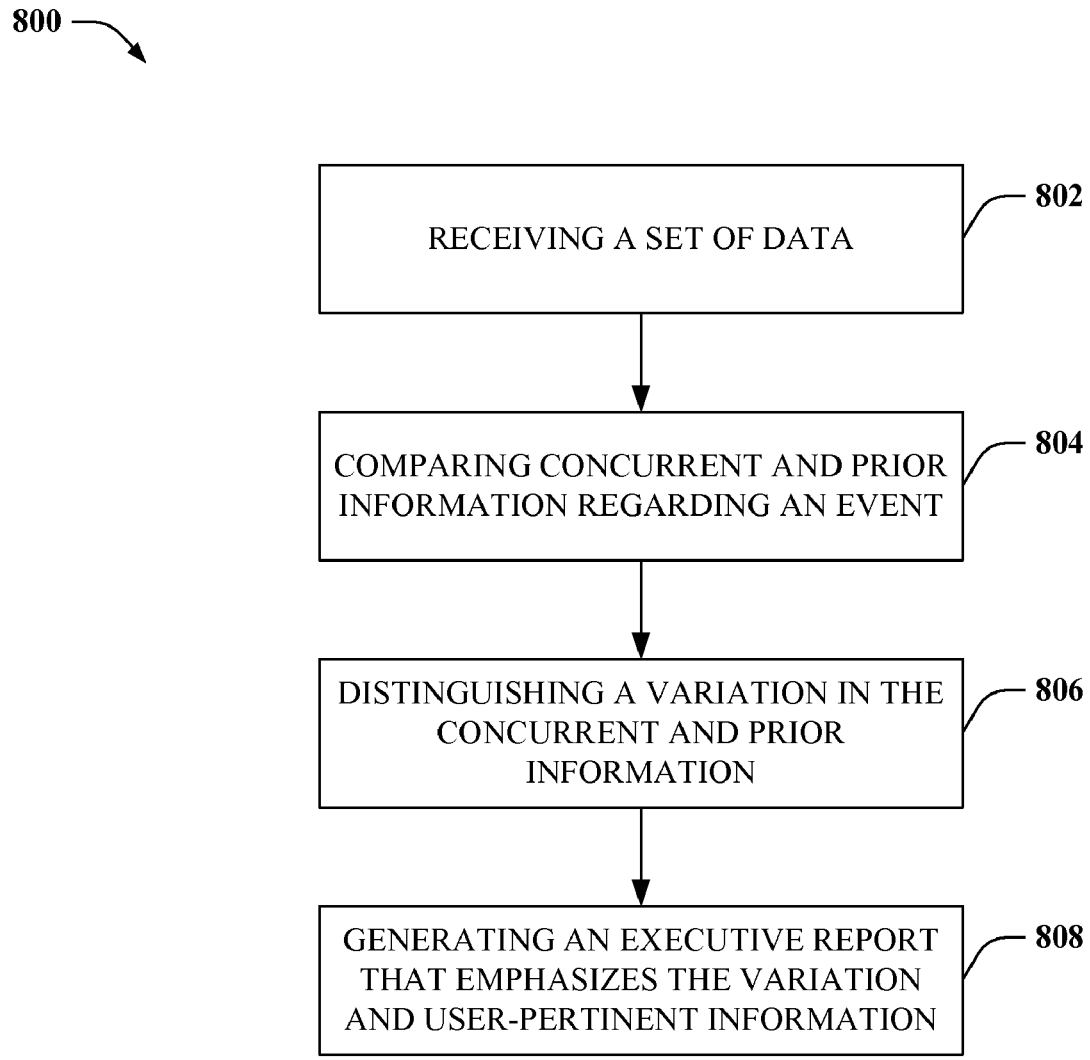
FIG. 8 illustrates a sample methodology for providing executive reporting that highlights changes in concurrent and prior data in accordance with other aspects.
Figure 9:
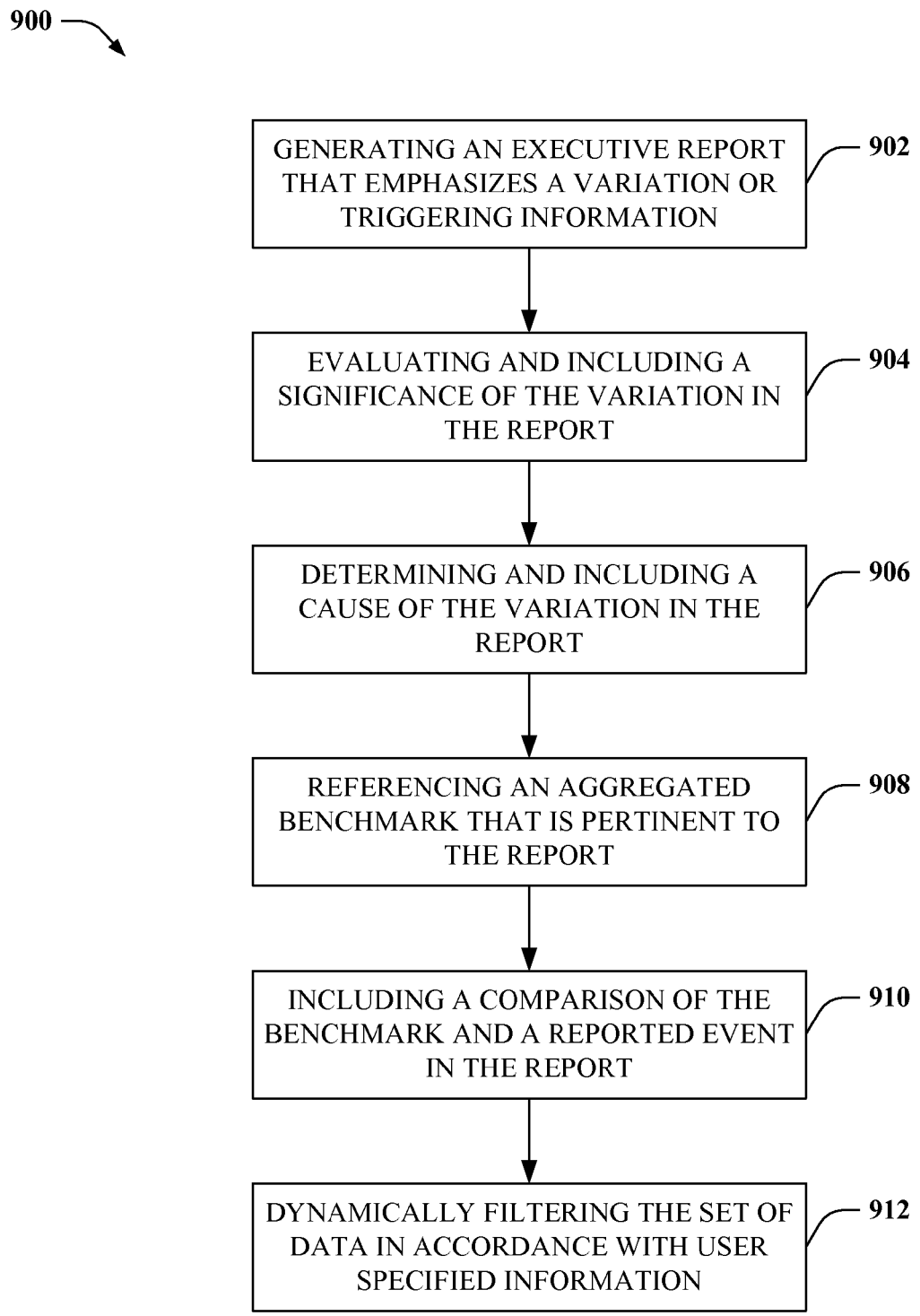
FIG. 9 depicts an example methodology for including a source and significance of changes in data in an executive report.
Figure 10:
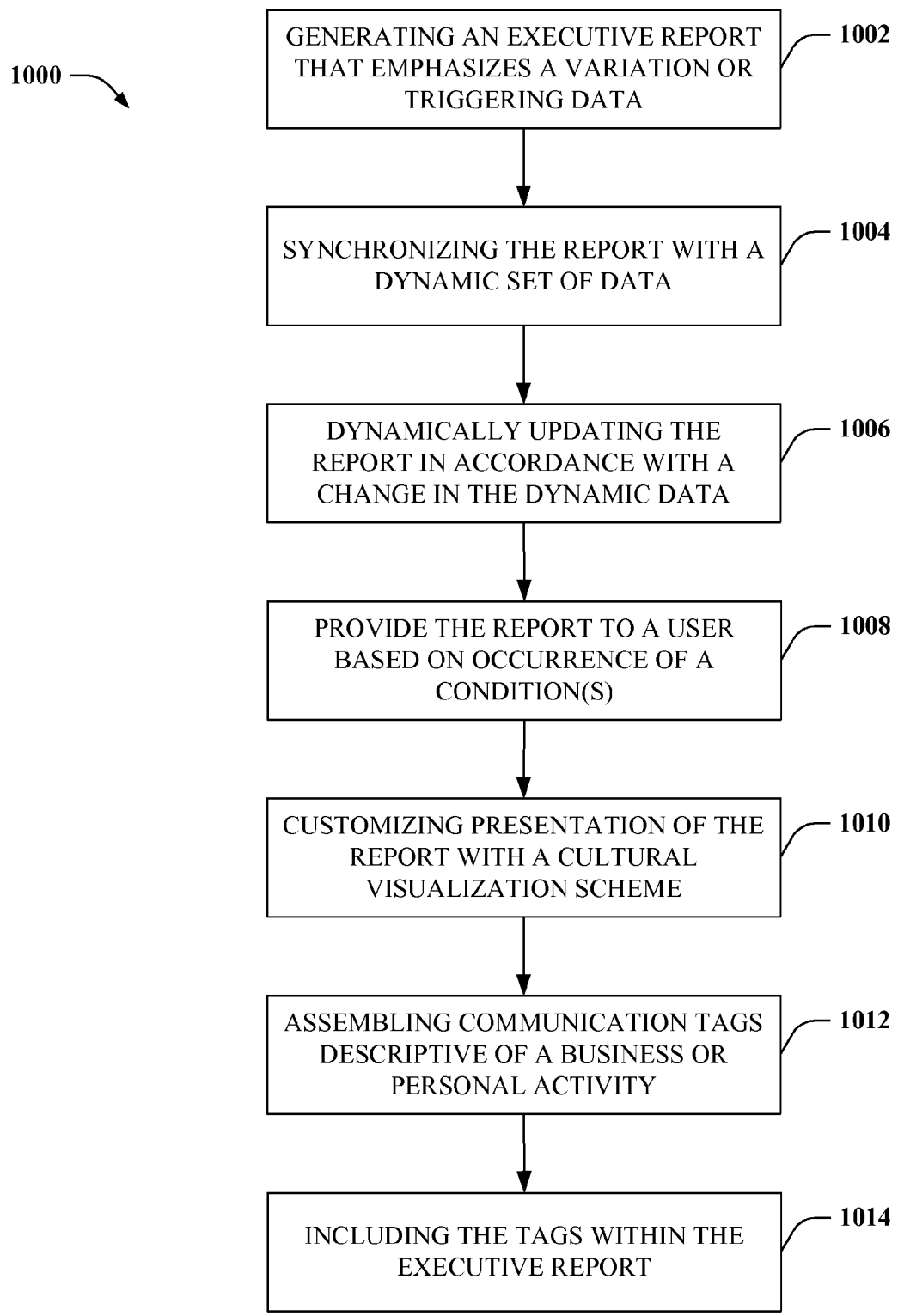
FIG. 10 illustrates a sample methodology for synchronizing and customizing data for an executive report in accordance with one or more aspects.

In view of the exemplary systems described supra, methodologies that may be implemented in accordance with the disclosed subject matter will be better appreciated with reference to the flow charts of FIGS. 8-10. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed hereinafter and throughout this specification are capable of being stored on an article of manufacture to facilitate transporting and transferring such methodologies to computers. The term article of manufacture, as used, is intended to encompass a computer program accessible from any computer-readable device, carrier, or media.

Referring to FIG. 8, a sample flowchart 800 is depicted for providing executive reporting that highlights changes in concurrent and prior data in accordance with additional aspects of the claimed subject matter. Method 800, at 802, receives a set of data. The set of data can be related to a report of a business or personal activity, for instance. As an example, such data can include information pertinent to a periodic description of such activity, where the data is updated in accordance with regular intervals, particular events, a predetermined trigger, such as a search conducted by a user, or a predetermined change in the set of data (e.g., stock price, resource or material availability or cost, overhead cost, an evaluative report of an item of interest, and so on), or a combination thereof. Activities can be related to a business of an entity such as quarterly profit reports, budget reports, overhead costs, marketing studies, research studies, new product engineering reports, and so on. Additionally, the activities can be business or personal events related to an individual or group, such as a meeting, entertainment event, trip, or the like. In addition, information and data received can be time stamped, when it is received, when it is first compiled by an electronic application, stored at a storage device, or the like. Such time stamp(s) can be relative, indicating prior or subsequent occurrence of sets of data, or absolute, providing a particular date and/or time of occurrence, for instance.

At 804, concurrent and prior information can be compared regarding one or more particular events associated with a business and/or personal activity. At 806, a time based variation in the prior and concurrent information can be distinguished. At 808, an executive report can be generated emphasizing at least the variation in the prior and concurrent information and that is formatted according to user specifications or containing information pertinent to the particular user. For instance, a user can indicate that one or more aspects of the set of data related to the report of a business or personal activity are to be monitored and variations associated with the monitored activity are to be included in the executive report. As a result, method 800 can provide a report of business and/or personal activity that emphasizes changes in user-specified information, whether periodic or event-triggered, saving time and adding efficiency with respect to a review of such a report.

Referring now to FIG. 9, a sample methodology 900 is illustrated for including a source and significance of changes in data in an executive report. Method 900, at 902, can generate an executive report that emphasizes at least a variation over a prior report. For instance, the executive report can refer to a concurrent and prior set of data and identify and incorporate the variation from the set(s) of data, as described herein. Additionally, at 904, method 900 can evaluate and include a significance of the variation into the report. For example, a quantitative or qualitative measurement/evaluation can be taken with respect to the data (e.g., a different in an amount of sales, total revenue, or like quantity, or an evaluation of customer feedback, supplier commitments, or like qualitative indication) to form a basis for the significance of the variation. An additional source of data (e.g., the Internet) can be referenced in order to provide more detailed information (e.g., an aggregated benchmark) related to such a measurement or evaluation (e.g., related sales results in an industry can be referenced and compared with sales results of a particular business). The measurement/evaluation can be utilized to generate a significance of a variation in concurrent and prior data, and such significance can be included within an executive report.

At 906, a cause of a variation in concurrent and prior data can be determined and included within an executive report. Similar to the significance, above, such cause can be identified by way of data included within the executive report or a prior report, or by reference to an external source of information (e.g., a data network). The cause, once identified, can be included within the executive summary. At 908, an aggregated benchmark can be referenced that is pertinent to at least one activity in the report. For instance, an online budget application can be utilized and form the basis of a set of results and report of such results. The aggregated benchmark can include a group of networked individuals who also utilized the online budget application, to create a budget for a small business, for instance. At 910, a comparison between the benchmark and a reported event can be performed and included within the report. At 912, the set of data can be dynamically filtered in accordance with user specified information, including recent user activity, a history of user interactions, a source of user interest, or a user contact list, or a combination thereof. Filtering in this manner can facilitate customizing an executive report to particular interests and desires of a user.

To continue the previous example, the online budget application may indicate that cleaning for the small business comes to $25 per square yard. An aggregated benchmark could indicate that similarly situated businesses pay only $20 per square yard, and so on. Such comparison could then be included within the executive report to indicate that the small business owner is paying relatively more for cleaning services than similarly situated business. Additionally, product/service histories can be referenced for the small business and compared with aggregated benchmarks from a relevant period. Further diagnostic information can thus be provided and included in an executive report in such a manner. As described, method 900 provides an executive report of periodic and/or event-triggered (e.g., resulting from a search or online task) data, including variations in past and prior data, reasons for those variations, and an estimation of the significance of such variations.

FIG. 10 illustrates a sample flowchart 1000 for synchronizing and customizing data for an executive report in accordance with one or more aspects. Method 1000, at 1002, can generate an executive report that emphasizes at least one variation in concurrent and prior data, as described herein. At 1004, the report can be synchronized with a dynamic set of data. For instance, a dynamic database can be referenced, such that changes to the dynamic database (e.g., greater than a predetermined threshold and/or with respect to a predetermined topic, subject, result, or the like) can trigger an update to the executive report. At 1006, method 600 automatically updates an executive report in accordance with a change identified in a dynamic set of data. As a result, the executive report can be modified to reflect changes in data pertinent to a topic of interest. At 1008, an updated executive report can be provided to a user, optionally based on occurrence of a predetermined condition(s). For instance, the condition can require a predetermined change occur, a magnitude of change, a rate of change, a pattern of change, or a number of changes in one or more predetermined items (e.g., price of an object as well as availability of 100 units). Also the change can specify a time of day, day of the week, location of the user, relationship of the user with other predetermined entities (e.g., lodging, restaurant), and so on, as described herein or known in the art. If the condition(s) is met, the executive report is provided to the user, if not, a report will not be sent until the condition(s) is met. Providing the report can be based on an e-mail message, instant message, voice mail message, audio message, video message, printing of a hard copy, or the like.

At 1010, a presentation of an executive report can be customized with a cultural visualization or scheme. For instance, the executive summary can be presented in a language, alphabet, dialect, or utilizing a body of standard appropriate for a predetermined culture or society. Furthermore, the visualization can be updated with respect to a determined current event, graphical depictions, historical event, or news pertinent to the culture or society, or combinations thereof or of the like. As a result, method 1000 can customize appearance of an executive report in conjunction with a visualization that provides a context consistent with cultural ideas and events that are important to the culture.

At 1012, a collection of communication tags, associated terms, or meta-data, or the like, descriptive of a business or personal activity, can be assembled from a source of business data (e.g., related to electronic communication of colleagues, co-workers, employees, and the like). At 1014, such tags, terms, meta-data, etc., can be included within the executive summary to provide an overview of current activities or events related to the business or personal activity. Consequently, method 1000 can provide a quick tag cloud describing topics of work, research, etc., performed by colleagues or co-workers to enable an individual (e.g., manager) to keep abreast of activity in a portion of a company, topics of interest for a social group or family, current events pertinent to a business or organization, or the like. As described, method 1000 can facilitate providing a customized report of business or personal activity particular to a user's current interests or activities, cultural background or associations, or the like. As a result, information most pertinent to an individual can be compiled and summarized in such a report, saving time in performing research and/or filtering through results of information researched by others.

Figure 11:
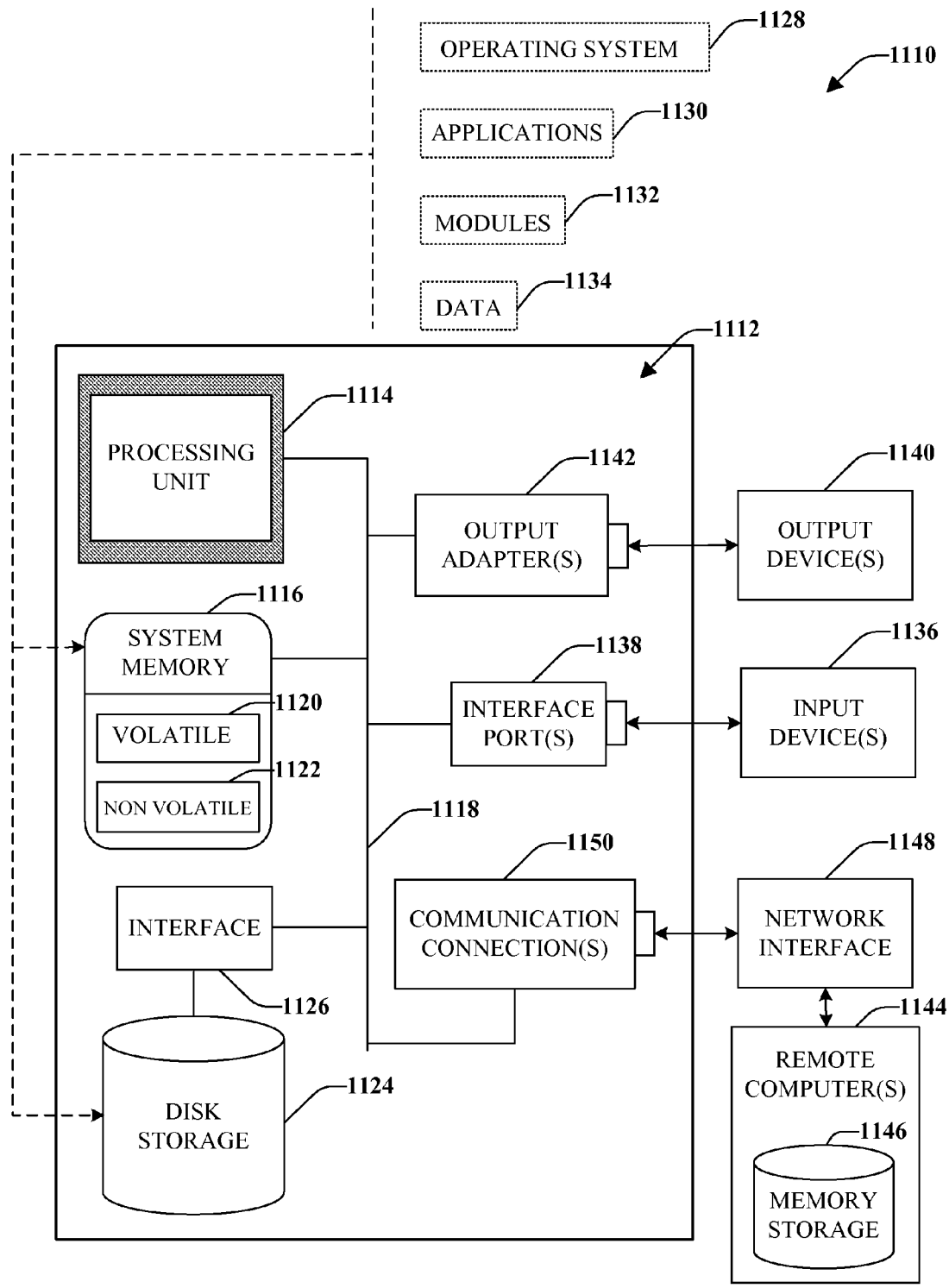
FIG. 11 depicts an example operating environment that provides electronic communication and processing for executive reporting in accord with further aspects.
Figure 12:
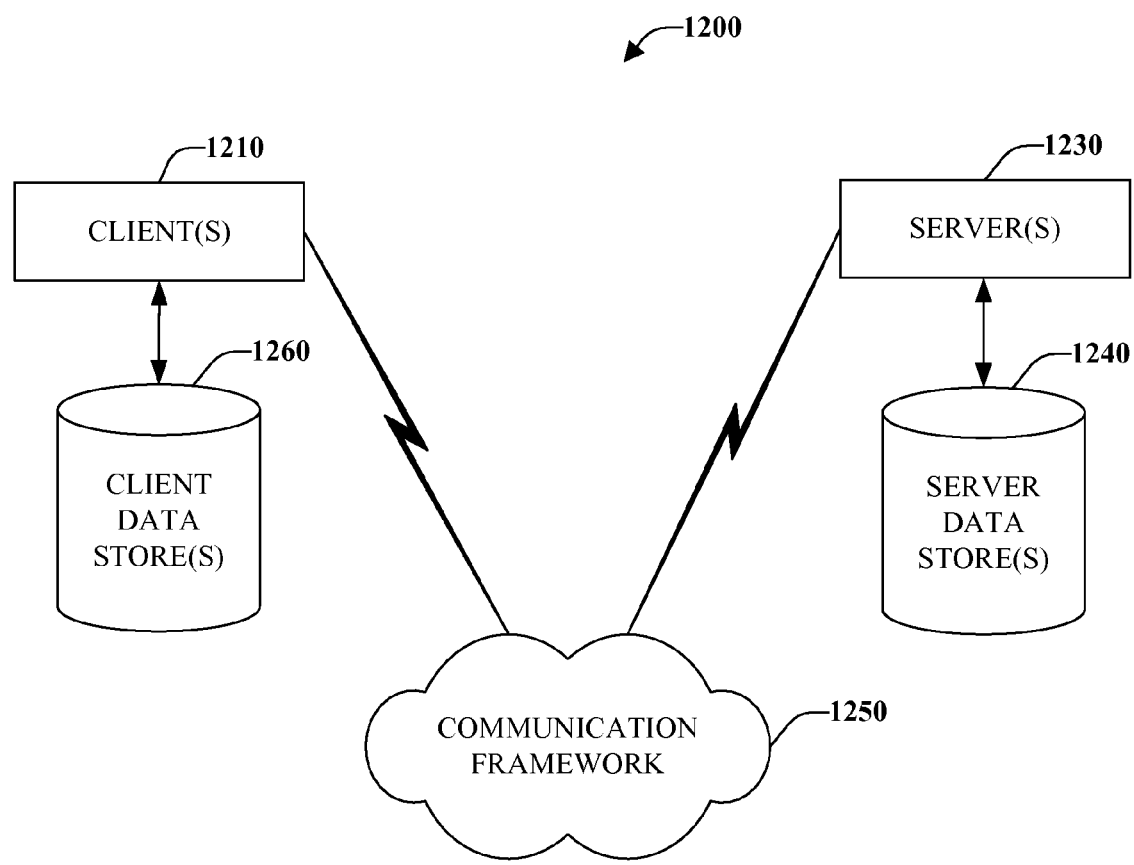
FIG. 12 depicts an example network environment that facilitates remote communication in accordance with still other aspects.

In order to provide additional context for various aspects of the disclosed subject matter, FIGS. 11 and 12 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the invention also may be implemented in combination with other program modules.

Generally, program modules include routines, programs, components, data structures, etc. that can perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., personal digital assistant (PDA), phone, watch...), microprocessor-based or programmable consumer or industrial electronics, and the like. The illustrated aspects may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices, described below.

With reference to FIG. 11, an exemplary environment 1110 for implementing various aspects disclosed herein includes a computer 1112 (e.g., desktop, laptop, server, hand held, programmable consumer or industrial electronics . . . ). The computer 1112 includes a processing unit 1114, a system memory 1116, and a system bus 1118. The system bus 1118 can couple system components including, but not limited to, the system memory 1116 to the processing unit 1114. The processing unit 1114 can be any of various microprocessors, such as dual microprocessors, quad microprocessors, and other multiprocessor architectures suitable for a computer environment 1110.

The system bus 1118 can be any of several types of suitable bus structure(s) including the memory bus or memory controller, a peripheral bus or external bus, and/or a local bus using any suitable variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable ROM (EEPROM), or flash memory. Volatile memory 1120 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1112 also includes removable/non-removable, volatile/non-volatile computer storage media. FIG. 11 illustrates, for example, disk storage 1124. Disk storage 1124 includes, but is not limited to, devices such as a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used such as interface 1126.

It is to be appreciated that FIG. 11 describes software that acts as an intermediary between users and the basic computer resources described in operating environment 1110. Such software can include an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that the present invention can be implemented with various operating systems or combinations of operating systems.

A user can enter commands or information into the computer 1112 through input device(s) 1136. Input devices 1136 can include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 can utilize some of the same type of ports as input device(s) 1136. Thus, for example, a USB port may be used to provide input to computer 1112 and to output information from computer 1112 to an output device 1140. Output adapter 1142 is provided to illustrate that there are some output devices 1140 like displays (e.g., flat panel and CRT), speakers, and printers, among other output devices 1140 that require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and can typically include many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit-switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems, power modems and DSL modems, ISDN adapters, and Ethernet cards or components.

FIG. 12 is a schematic block diagram of a sample-computing environment 1200 with which aspects of the subject innovation can interact. The system 1200 includes one or more client(s) 1210. The client(s) 1210 can be hardware and/or software (e.g., threads, processes, computing devices). The system 1200 also includes one or more server(s) 1230. Thus, system 1200 can correspond to a two-tier client server model or a multi-tier model (e.g., client, middle tier server, data server), amongst other models. The server(s) 1230 can also be hardware and/or software (e.g., threads, processes, computing devices). The servers 1230 can house threads to perform transformations by employing the present invention, for example. One possible communication between a client 1210 and a server 1230 may be in the form of a data packet adapted to be transmitted between two or more computer processes.

The system 1200 includes a communication framework 1250 that can be employed to facilitate communications between the client(s) 1210 and the server(s) 1230. The client(s) 1210 are operatively connected to one or more client data store(s) 1260 that can be employed to store information local to the client(s) 1210. Similarly, the server(s) 1230 are operatively connected to one or more server data store(s) 1240 that can be employed to store information local to the servers 1230.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" are used in either the detailed description or the claims, such terms are intended to be inclusive in a manner similar to the term "comprising" as "comprising" is interpreted when employed as a transitional word in a claim.

What is claimed is:

1. A computer-implemented system that facilitates executive reporting, the system comprising:
   a computer including at least one processor and at least one computer-readable storage medium, wherein the computer-readable storage medium includes the following components:
      an inference engine that receives a set of data related to a periodic or event-triggered report and outputs a set of results, the set of results is indicative of a change within the set of data over a prior report or with respect to a predetermined characteristic of a triggering event;
      a synthesis component that filters the set of data or the set of results and extracts information pertinent to at least one user, and compiles an executive summary that contains the set of results and the information pertinent to the at least one user;
      a community search engine that:
         derives an aggregated benchmark based at least in part on data obtained from a community of entities that are associated with data within the set of results; and
         performs a comparison of the data within the set of results with the aggregated benchmark;
      a notification component that includes a recommended action in the executive summary based at least in part on the comparison; and
      a custom visualization engine that formats a presentation or appearance of the executive summary into at least one of a language, alphabet, or dialect and a body of standards associated with a predetermined culture or society.

2. The system of claim 1, further comprising a data analysis component that determines a cause of the change, or a magnitude of the change with respect to at least one additional change identified in the set of data over the prior report, wherein the information contained in the executive summary identifies the cause of the change or distinguishes the change from the additional change at least as a function of magnitude, or both.

3. The system of claim 1, further comprising a data abstraction component that provides the information pertinent to at least one user to the synthesis component by filtering the set of data or the set of results according to recent user activity, a history of user interactions, a source of user interests, a user profile, or a combination thereof.

4. The system of claim 3, the periodic or event-triggered report and set of results are filtered based on a prior task or scheduled future task contained in a task database, and based on data pertaining to such task.

5. The system of claim 3, further comprising a synchronization component that interfaces with a data source containing the set of data and revises the set of results according to a change in the set of data executed at the data source.

6. The system of claim 1, the set of data includes an information field comprised of tags, terms, or meta-data associated with an electronic communication of a colleague, employee, team member, supervisor, customer, supplier, social contact, or a member of a buddy list, or a combination thereof, that provides a descriptive name space of business related activities, terminologies, associations, or project results, or a combination thereof, included within the electronic communication.

7. The system of claim 1, wherein the custom visualization engine further formats the presentation or appearance with respect to current events, graphical depictions, histories, or news pertinent to the culture or society, or combinations thereof.

8. The system of claim 1, further comprising a user relevancy component that presents additional information in the executive summary or biases the information highlighting the change by cross-referencing a second set of data, the second set of data stores information related to a user's contact list, calendar appointment list, client list, professional or social buddy list, a dynamically generated list, or individuals or businesses associated therewith, or a combination thereof.

9. The system of claim 1, further comprising a remote processing component that facilitates receipt of the set of data, periodic or event-triggered report, or prior report, from a remote network data store and facilitates compilation of the executive summary at a local processor of a device.

10. A method for providing an executive summary of an evolving set of data, the method comprising:
employing a processor that executes instructions retained in a computer memory, the instructions executed by the processor implement operations including:
receiving a set of data related to a periodic or event-triggered report of a business or personal activity;
comparing information within the set of data regarding an event with prior information regarding the event;
distinguishing a variation in the information and the prior information;
referencing an external group of entities associated with the variation to determine an aggregated benchmark;
evaluating the information, the prior information and the aggregated benchmark to determine a significance of the variation;
generating an executive summary of information related to the business or personal activity that emphasizes at least the variation and is formatted for or includes information pertinent to a particular user; and
translating the executive summary into at least one of a language, alphabet, or dialect and a body of standards associated with a predetermined culture or society.

11. The method of claim 10, the operations further including at least one of:
evaluating a significance of the variation;
evaluating a cause of the variation; or
including the significance or the cause of the variation in the executive report.

12. The method of claim 10, the operations further including dynamically filtering the set of data in accordance with user specified information, including recent user activity, a history of user interactions, a source of user interest, or a user contact list, or a combination thereof, to provide the format for or information pertinent to the particular user.

13. The method of claim 10, the operations further including at least one of:
referencing an aggregated benchmark pertinent to the event, the aggregated benchmark is comprised of information pertaining to a plurality of entities, is related to the business or personal activity, and is contained on or compiled from a data network;
including a comparison between the information regarding the event and the aggregated benchmark in the executive report; and
including a recommended action in the executive summary based at least in part on the comparison.

14. The method of claim 10, the operations further including:
synchronizing the executive report and the set of data; and
dynamically updating the executive report in accordance with a change in the set of data.

15. The method of claim 10, the operations further including:
updating a visualization of the executive summary with respect to a current event, graphical depiction, historical event, or news pertinent to the culture or society, or a combination thereof.

16. The method of claim 10, the operations further including:
assembling a collection of tags, associated terms, or metadata pertaining to an electronic communication or group of communications to or from a colleague, employee, team member, supervisor, customer, supplier, social contact, or a member of a buddy list of a user, or a combination thereof; and
including the collection within the executive summary to provide an overview of current activities or events related to the business or personal activity.

17. One or more computer-readable storage media storing computer-executable instructions that, when executed, cause one or more processors to perform operations comprising:
receiving a set of data related to a periodic or event-driven report of a business or personal activity;
comparing information regarding the business or personal activity with prior information regarding the activity;
distinguishing a variation between the information and the prior information;
referencing an external group of entities associated with the variation to determine an aggregated benchmark;
evaluating the information, the prior information and the aggregated benchmark to determine a significance of the variation;
generating an executive report of the business or the personal activity that features at least the variation and is formatted for or includes information pertinent to a user; and
presenting the executive report in at least one of a language, alphabet, or dialect associated with a predetermined culture or society associated with the user.

18. The one or more computer-readable storage media of claim 17, further comprising determining a cause of the variation and including at least one of the cause, the significance or the aggregated benchmark in the executive report.

19. The one or more computer-readable storage media of claim 17, further comprising dynamically filtering the set of data in accordance with user specified information, including recent user activity, a history of user interactions, a source of user interest, or a user contact list, or a combination thereof; and
generating the executive report with the format for or information pertinent to the user based on the filtering.

* * * * *